June 7, 1955 B. B. MANASTER 2,709,814
COLLAR STAY FOR SOFT COLLARS
Filed March 13, 1952
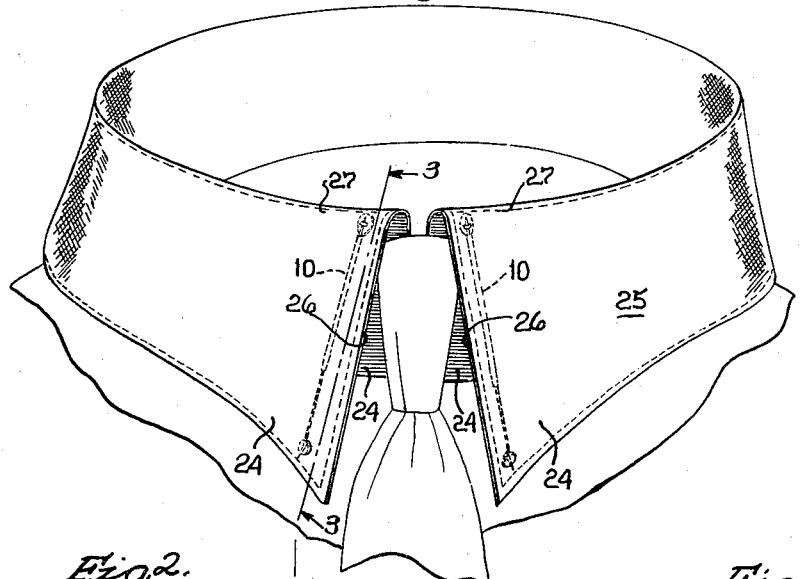
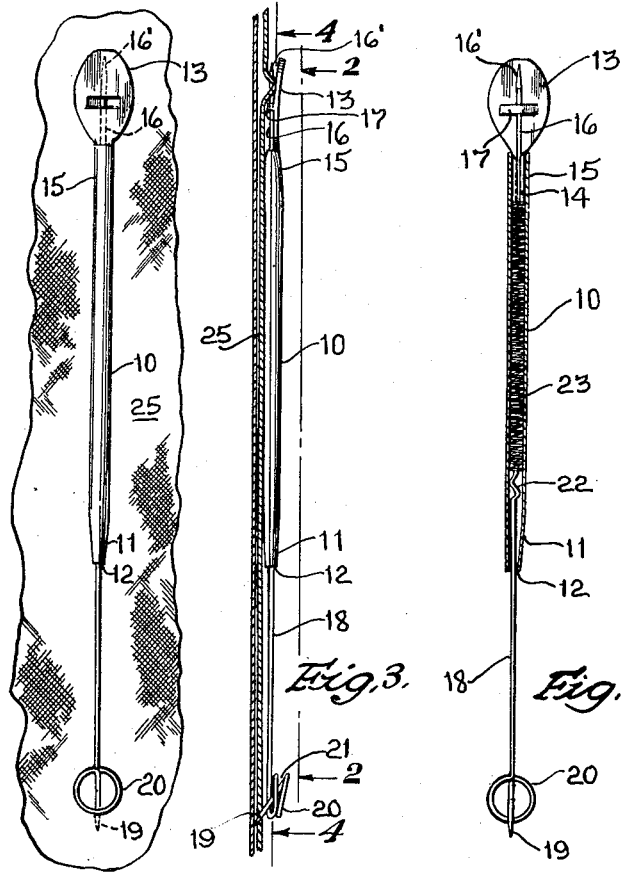
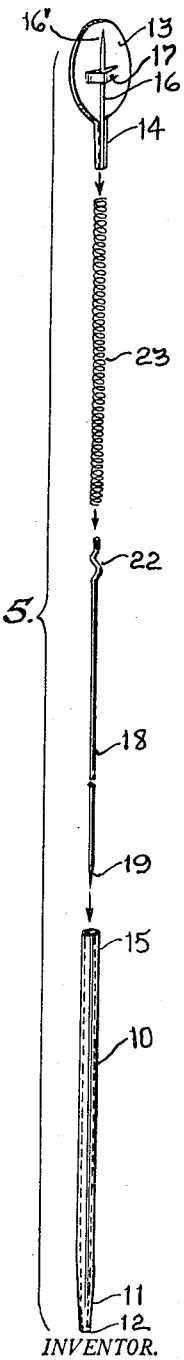
INVENTOR.
Ben B. Manaster
BY *Clarence E. Threedy*
HIS ATTORNEY.

United States Patent Office 2,709,814
Patented June 7, 1955

2,709,814

COLLAR STAY FOR SOFT COLLARS

Ben B. Manaster, Chicago, Ill., assignor to Crest Specialty (Not Inc.), Chicago, Ill., a copartnership Application March 13, 1952, Serial No. 276,410

2 Claims. (Cl. 2—132)

This invention relates to a collar stay for soft collars.

An object of the invention is to provide a collar stay which will be wholly concealed between the folds of a soft shirt collar and one which will maintain the tips of the shirt collar in a flat and unfolded condition, thereby to improve the appearance of the collar and to remove any wrinkles or creases.

Another object of the invention is to provide a collar stay of the character hereinafter described which may with safety be conveniently and readily mounted upon the collar between the folds thereof, substantially along the adjacent edges thereof, so as to maintain the collar in wrinkle-free condition.

Yet another and equally important object of the invention is to provide a collar stay of the character hereinafter described which comprises relatively few parts and which by reason thereof may be manufactured at an economical cost.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view of a shirt collar showing my invention associated therewith;

Fig. 2 is an elevational view taken substantially on line 2—2 of Fig. 3;

Fig. 3 is a sectional detail view taken substantially on line 3—3 of Fig. 1;

Fig. 4 is a sectional detail view taken substantially on line 4—4 of Fig. 3;

Fig. 5 is a perspective view of the several parts constituting my collar stay, showing the same in exploded relation with respect to each other.

The drawings illustrate my collar stay in enlarged form.

The several objects of my invention are accomplished by the preferred form of construction shown in the accompanying drawings and in which a tubular section is indicated at 10. This tubular section has one end portion 11 tapered to provide a restricted opening 12. A disc-shaped shield 13 provides a shank 14 which is fixedly driven into the end 15 of the section 10. After the shank is inserted in the end portion 15 of the section 10, such end portion is slightly swaged or pinched in order to provide a fixed connection between the shield 13 and the section 10. Prior to insertion of this shank 14 into the tubular section 10, a pin 16 has an end portion frictionally positioned in the shank 14. This shank 14 may be of any approved construction, in the present instance it being shown as comprising an open channel into which an end portion of the pin 16 is positioned. After the positioning of the pin 16 in the channel 14, the same is slightly pinched to provide a fixed connection between the pin and the shank. To maintain the pin 16 in a longitudinal position upon the shield 13, there is struck from the shield 13 a strap 17, beneath which the pin 16 is positioned.

My collar stay further comprises a leg section 18 at the outer end of which is provided a penetrating point 19 and an arrangement 20 to limit the penetration of the point 19 into the collar fabric. This arrangement 20 may be constructed substantially similar to that shown in my Patent No. Re. 22,698, dated November 27, 1945, and here shown as a loop 21 terminating into the penetrating point 19 which is projected forwardly through the loop.

The opposite end portion of the leg section 18 which is projected into the tubular section 10 is crimped or otherwise deformed as at 22 to provide a stop to limit the projection of the leg section outwardly relative to the tubular section 10. Within the tubular section between the end portion 22 of the leg section 18 and the shank 14 is arranged a spring 23 which yieldably projects the leg section 18 longitudinally outwardly with respect to the tubular section 10.

In assembling the collar stay, the leg section 18 is inserted into the tubular section 10 prior to the formation of the loop 21. After the leg section has been projected into the tubular section 10, the spring 23 is then mounted in the tubular section. The pin 16 is mounted upon the shield 13 after which the shank 14 of the shield 13 is projected into the end 15 of the tubular section 10, at which time the end portion is pinched or swaged to provide the fixed connection between the shank 14 and the tubular section 10. The loop 21 may be formed either after the leg section 18 is projected into the tubular section 10, or after the parts have been completely assembled.

The assembled collar stay is positioned between the folds 24 of the collar 25 substantially adjacent to and along the edge 26 of the front fold 24 of the collar. The tubular section 10 and leg section 18 are adjusted relative to each other so as to position their respective penetrating points 16' and 19 for penetration into the fabric of the collar 25. It will be noted that the shield 13 is of elongated formation and is disposed at one side of the pin 16 and projects beyond the penetrating point 16' of the pin. In applied position the shield 13 will engage the fold 27 of the collar and thereby prevent the pin from projecting through the fabric into contact with the neck of the wearer. This shield also serves the additional function of guarding against the user's piercing his fingers by the penetrating point when applying the collar stay to the collar.

It is, of course, obvious that there are two such collar stays for each collar, one being applied to each collar tip on the underside of the outer fold substantially along the edge thereof. When thus applied to the collar, the collar will be wrinkle-free and extend in a smooth and flat condition.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A collar stay comprising two telescopically arranged members one of said members movable relative to the other, said members including an elongated tubular member having one end tapered to form a restricted opening, a leg section having one end portion slidably arranged in said one end of said tubular member, an elongated disc-shaped member having a shank fixedly projected into the opposite free end of the tubular member, a spring element arranged in the tubular member between said shank and the adjacent end of said leg section to yieldably project said leg section in the direction of its length and longitudinally through said restricted opening of the tubular member, penetrating means at the outer end portion of said leg section, a penetrating member carried by the shank of said disc-shaped member and terminating short of the outer end of said disc-shaped member, a strap struck from said disc-shaped member and adapted to embrace said penetrating member to secure said member in a longitudinal position with respect to said disc-shaped member, said leg section provided with a plurality of coils adjacent the penetrating means to limit the penetration of said penetrating means, said one end portion of said leg section slidably arranged within said tubular member crimped so as to provide operative connection between said leg section and said spring and to prevent rotation of said leg section relative to said tubular member, said crimped portion of said leg section restricting movement of said leg in one direction by said spring member through said restricted opening of said tubular member.

2. A collar stay comprising two telescopically arranged members one of said members movable relative to the other, said members including an elongated tubular member having one end tapered to form a restricted opening, a leg section having one end portion slidably arranged in said one end of said tubular member, a disc-shaped member fixedly carried at the opposite free end of said tubular member, spring means arranged in said tubular member, spring means arranged in said tubular member and acting on said leg section to yieldably project said leg section in the direction of its length and longitudinally through said restricted opening of the tubular member, penetrating means at the outer end portion of said leg section, a penetrating member carried by the shank of said disc-shaped member and terminating short of the outer end of the latter, a strap struck from said disc-shaped member and adapted to embrace said penetrating member to secure said member in a longitudinal position with respect to said disc-shaped member, said leg section provided with a plurality of coils adjacent the penetrating means to limit the penetration of said penetrating means, said one end portion of said leg section slidably arranged within said tubular member crimped so as to provide operative connection between said leg section and said spring and to prevent rotation of said leg section relative to said tubular member, said crimped portion of said leg section restricting movement of said leg in one direction by said spring member through said restricted opening of said tubular member.

References Cited in the file of this patent
UNITED STATES PATENTS

| Number | Name | Date |
|---|---|---|
| 1,851,197 | Louis | Mar. 29, 1932 |
| 1,908,525 | Manaster | May 9, 1933 |
| 1,977,331 | Whitman | Oct. 16, 1934 |
| 2,371,338 | Manaster | Mar. 13, 1945 |
| 2,431,053 | Less | Nov. 18, 1947 |
| 2,456,887 | Morrison | Dec. 21, 1948 |
| 2,505,679 | Less et al. | Apr. 25, 1950 |
| 2,562,519 | Ashley | July 31, 1951 |